(12) United States Patent
Nakamura et al.

(10) Patent No.: US 9,488,112 B2
(45) Date of Patent: Nov. 8, 2016

(54) VARIABLE VALVE TIMING CONTROL APPARATUS

(75) Inventors: Takayoshi Nakamura, Kariya (JP); Haruyuki Urushihata, Kariya (JP)

(73) Assignee: DENSO CORPORATION, Kariya (JP)

( * ) Notice: Subject to any disclaimer, the term of this patent is extended or adjusted under 35 U.S.C. 154(b) by 326 days.

(21) Appl. No.: 13/208,652

(22) Filed: Aug. 12, 2011

(65) Prior Publication Data

US 2012/0055429 A1    Mar. 8, 2012

(30) Foreign Application Priority Data

Sep. 2, 2010  (JP) .................................. 2010-197074

(51) Int. Cl.
| | |
|---|---|
| *F01L 1/34* | (2006.01) |
| *F01L 1/00* | (2006.01) |
| *F02D 13/02* | (2006.01) |
| *F01L 1/344* | (2006.01) |

(52) U.S. Cl.
CPC .......... *F02D 13/0238* (2013.01); *F01L 1/3442* (2013.01); *F01L 2001/3443* (2013.01); *F01L 2001/34459* (2013.01); *F01L 2001/34463* (2013.01); *F01L 2001/34466* (2013.01); *F01L 2001/34469* (2013.01); *F01L 2001/34483* (2013.01); *F01L 2250/02* (2013.01); *F01L 2800/00* (2013.01); *F01L 2800/12* (2013.01); *F01L 2820/041* (2013.01); *F01L 2820/042* (2013.01); *Y02T 10/18* (2013.01)

(58) Field of Classification Search
CPC ........... F01L 1/022; F01L 1/024; F01L 1/34; F01L 1/344; F01L 1/3442; F01L 13/0036; F01L 2001/34469; F01L 2800/00
USPC ........... 123/90.17, 90.15, 90.31, 90.34, 90.1, 123/90.16; 29/888.1; 464/160
See application file for complete search history.

(56) References Cited

U.S. PATENT DOCUMENTS

| | | | | |
|---|---|---|---|---|
| 6,330,870 | B1 * | 12/2001 | Inoue et al. ............... | 123/90.17 |
| 6,505,586 | B1 | 1/2003 | Sato et al. | |
| 6,612,274 | B2 * | 9/2003 | Iizuka et al. .............. | 123/90.16 |
| 2002/0139332 | A1 | 10/2002 | Takenaka et al. | |
| 2003/0230267 | A1 * | 12/2003 | Quinn, Jr. .................. | 123/90.17 |
| 2004/0003788 | A1 * | 1/2004 | Taylor et al. .............. | 123/90.15 |
| 2004/0129239 | A1 * | 7/2004 | Yoshikawa et al. ....... | 123/90.17 |
| 2005/0229879 | A1 * | 10/2005 | McCabe et al. ........... | 123/90.15 |
| 2010/0332110 | A1 * | 12/2010 | Wada et al. ................ | 701/106 |
| 2011/0000449 | A1 | 1/2011 | Urushihata et al. | |

FOREIGN PATENT DOCUMENTS

| | | |
|---|---|---|
| JP | 2002-256912 | 9/2002 |
| JP | 2010-133272 | 6/2010 |
| JP | 2011-32905 | 2/2011 |

OTHER PUBLICATIONS

Office Action (2 pages) dated Jan. 31, 2013, issued in corresponding Japanese Application No. 2010-197074 and English translation (3 pages).

* cited by examiner

*Primary Examiner* — Kenneth Bomberg
*Assistant Examiner* — Daniel Wagnitz
(74) *Attorney, Agent, or Firm* — Nixon & Vanderhye P.C.

(57) ABSTRACT

A variable valve timing control apparatus includes an abnormality determining portion and a valve controller. The abnormality determining portion determines whether there is an abnormality in a system of a VCT phase control in which an oil pressure control valve is controlled in a manner that an actual VCT phase coincides with a target phase. The valve controller controls the oil pressure control valve to drive a lock pin in a locking direction so as to lock the VCT phase when the abnormality determining portion determines that there is an abnormality in the system of the VCT phase control.

18 Claims, 8 Drawing Sheets

VARIABLE VALVE TIMING CONTROL APPARATUS

CROSS REFERENCE TO RELATED APPLICATION

This application is based on Japanese Patent Application No. 2010-197074 filed on Sep. 2, 2010, the disclosure of which is incorporated herein by reference in its entirety.

BACKGROUND OF THE INVENTION

1. Field of the Invention

The present invention relates to a variable valve timing control apparatus.

2. Description of Related Art

JP-A-2002-357105 (US 2002/0139332 A1) describes an oil-pressure drive type variable valve timing device for an engine, in which a rotation phase of a camshaft with respect to a crankshaft is locked into a predetermined lock phase when the engine is stopped. The rotation phase of the camshaft with respect to the crankshaft is defined as variable cam timing (VCT) phase. The lock phase is set into an approximately middle in a controllable range of the VCT phase, so as to enlarge a controllable range of the valve timing. The middle lock phase is set suitably for start-up of the engine. The engine is activated in a state where the VCT phase is locked into the middle lock phase using a lock pin. When the start-up of the engine is completed, an oil pressure is raised to an appropriate value. Then, the lock pin is retreated so as to unlock the VCT phase, and the VCT phase is moved to a target phase in accordance with an operation state of the engine using a feedback control. When a lock requirement is generated in engine stop time or in engine idling time, the VCT phase is locked into the middle lock phase by the lock pin.

JP-A-2011-032905 describes a lock control in which a VCT phase is locked into a middle lock phase after the VCT phase is moved to a target phase past the middle lock phase by a predetermined angle. That is, feedback control is performed, and then, a lock pin locks the VCT phase while the VCT phase returns toward the middle lock phase.

However, when a malfunction is generated in a system that controls the VCT phase, for example, when an actual VCT phase cannot be calculated by a break in a line that transmits a crank signal or a cam signal, the feedback control cannot be performed. In this case, because the VCT phase may be unable to be locked into the middle lock phase, start-up property of the engine may get worse at the next engine activation time.

In JP-A-2002-357105, a system to control the VCT phase has an advance restricting pin and a retard restricting pin, and at least one of the restricting pins is used as a lock pin. One of the restricting pins may stick to a retreat position while both of the restricting pins are controlled to project. One of the restricting pins may stick to a projection position while both of the restricting pins are controlled to retreat. Because the projecting pin may collide to an inner wall face of a restriction groove, strange sound may occur, or wear or breakage may occur in the pin or the groove.

Moreover, when an engine stall (failure) occurs, the engine stops without an engine stop command in very short time, so that the VCT phase may be unable to be locked into the middle lock phase. In this case, start-up property of the engine may get worse at the next engine activation time.

SUMMARY OF THE INVENTION

In view of the foregoing and other problems, it is an object of the present invention to provide a variable valve timing control apparatus.

According to an example of the present invention, a variable valve timing control apparatus includes a variable valve timing device, a lock pin, an oil pressure control valve, a VCT phase controller, an abnormality determining portion, and a valve controller. The variable valve timing device controls valve timing of an intake valve or exhaust valve by changing a rotation phase of a camshaft with respect to a crankshaft in an engine. The rotation phase of the camshaft with respect to the crankshaft is defined as a VCT phase. The lock pin locks the VCT phase at a predetermined lock phase positioned in a controllable range of the VCT phase. The oil pressure control valve controls an oil pressure that drives the variable valve timing device and the lock pin. The VCT phase controller performs a VCT phase control in which the oil pressure control valve is controlled in a manner that an actual VCT phase coincides with a target phase. The abnormality determining portion determines whether there is an abnormality in a system of the VCT phase control. The valve controller controls a control amount of the oil pressure control valve so as to drive the lock pin in a locking direction so that the VCT phase is locked when the abnormality determining portion determines that there is an abnormality in the system of the VCT phase control.

Therefore, even if the VCT phase control cannot be performed, the VCT phase can be locked when the VCT phase coincides with the lock phase before the engine is stopped.

The VCT phase may be locked at a most retard phase or a most advance phase in the controllable range of the VCT phase. Alternatively, the predetermined lock phase may be a middle lock phase located middle between the most retard phase and the most advance phase. In this case, the present invention is especially effective because it is difficult to lock the VCT phase into the middle lock phase when there is an abnormality in the system of the VCT phase control.

For example, the VCT phase controller has means for calculating the actual VCT phase based on a crank angle signal and a cam angle signal. The abnormality determining portion determines that there is an abnormality in the system of the VCT phase control when the calculating means is incapable to calculate the actual VCT phase due to an abnormality in the crank angle signal or the cam angle signal.

For example, the VCT phase controller has means for learning a reference phase corresponding to a reference position of the VCT phase in a calculation of the actual VCT phase. The abnormality determining portion determines that there is an abnormality in the system of the VCT phase control when the VCT phase control is unable to be started due to incompleteness in the learning of the reference phase.

In a system having the variable valve timing device that controls valve timing of the intake valve, the reference phase may be the most retard phase or middle lock phase. In a system having the variable valve timing device that controls valve timing of the exhaust valve, the reference phase may be the most advance phase or middle lock phase.

For example, the variable valve timing control apparatus further includes a plurality of restricting pins to limit the VCT phase, and at least one of the plurality of restricting pins corresponds to the lock pin. The abnormality determining portion determines that there is an abnormality in the system of the VCT phase control when at least one of the plurality of restricting pins is incapable to project while the plurality of restricting pins is controlled to project so as to limit the VCT phase. The valve controller controls the control amount of the oil pressure control valve so as to make the plurality of restricting pins to project when the abnormality determining portion determines that there is an abnormality in the system of the VCT phase control. Therefore, even if one of the pins cannot retreat by abnormality, the VCT phase can be limited or locked by making the pins as much as possible to project.

For example, the abnormality determining portion determines that there is an abnormality in the system of the VCT phase control when at least one of the plurality of restricting pins is incapable to retreat while the plurality of restricting pins is controlled to retreat so as to unlock the limitation of the VCT phase. The valve controller controls the control amount of the oil pressure control valve so as to make the plurality of restricting pins to project when the abnormality determining portion determines that there is an abnormality in the system of the VCT phase control. Therefore, if one of the pins cannot retreat by abnormality, the VCT phase can be limited or locked by making the pins as much as possible to project.

For example, in a system having the variable valve timing device that controls valve timing of the intake valve and the lock pin to lock the VCT phase at the middle lock phase, an engine stall predicting portion predicts whether a stall will be generated in the engine, and a valve controller controls a control amount of the oil pressure control valve (i) so as to drive the lock pin to lock the VCT phase regardless of the VCT phase, (ii) so as to drive the VCT phase in an advance direction, or (iii) so as to drive the lock pin in the locking direction and drive the VCT phase in the advance direction, when the engine stall predicting portion predicts that a stall will be generated in the engine.

Therefore, the VCT phase can be locked when the VCT phase coincides with the middle lock phase before the engine is stopped.

In the system having the variable valve timing device of the intake valve, in a case where the engine has a stall, if the engine is stopped in a state that the VCT phase is located at the most retard phase, the startup property of the engine may become worse.

However, the engine can be restricted from being stopped in the state that the VCT phase is located at the most retard phase by advancing the VCT phase from the most retard phase.

For example, in a system having the variable valve timing device that controls valve timing of the exhaust valve and the lock pin to lock the VCT phase at the middle lock phase, an engine stall predicting portion predicts whether a stall will be generated in the engine, and a valve controller controls a control amount of the oil pressure control valve (i) so as to drive the lock pin in a locking direction regardless of the VCT phase, (ii) so as to drive the VCT phase in a retard direction, or (iii) so as to drive the lock pin in the locking direction and drive the VCT phase in the retard direction, when the engine stall predicting portion predicts that a stall will be generated in the engine.

Therefore, the VCT phase can be locked when the VCT phase coincides with the middle lock phase before the engine is stopped.

In the system having the variable valve timing device of the exhaust valve, in a case where the engine has a stall, if the engine is stopped in a state that the VCT phase is located at the most advance phase, the startup property of the engine may become worse, or drivability of the engine may become worse when the engine is restarted.

However, the engine can be restricted from being stopped in the state that the VCT phase is located at the most advance phase by retarding the VCT phase from the most advance phase.

For example, the engine stall predicting portion predicts the generation of the engine stall when a lowering in a rotation speed of the engine relative to an idling-time rotation speed of the engine becomes equal to or larger than a predetermined value.

For example, the engine stall predicting portion predicts the generation of the engine stall when a lowering in a rotation speed of the engine per unit period becomes equal to or larger than a predetermined value.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENT (First Embodiment)

Figure 1:
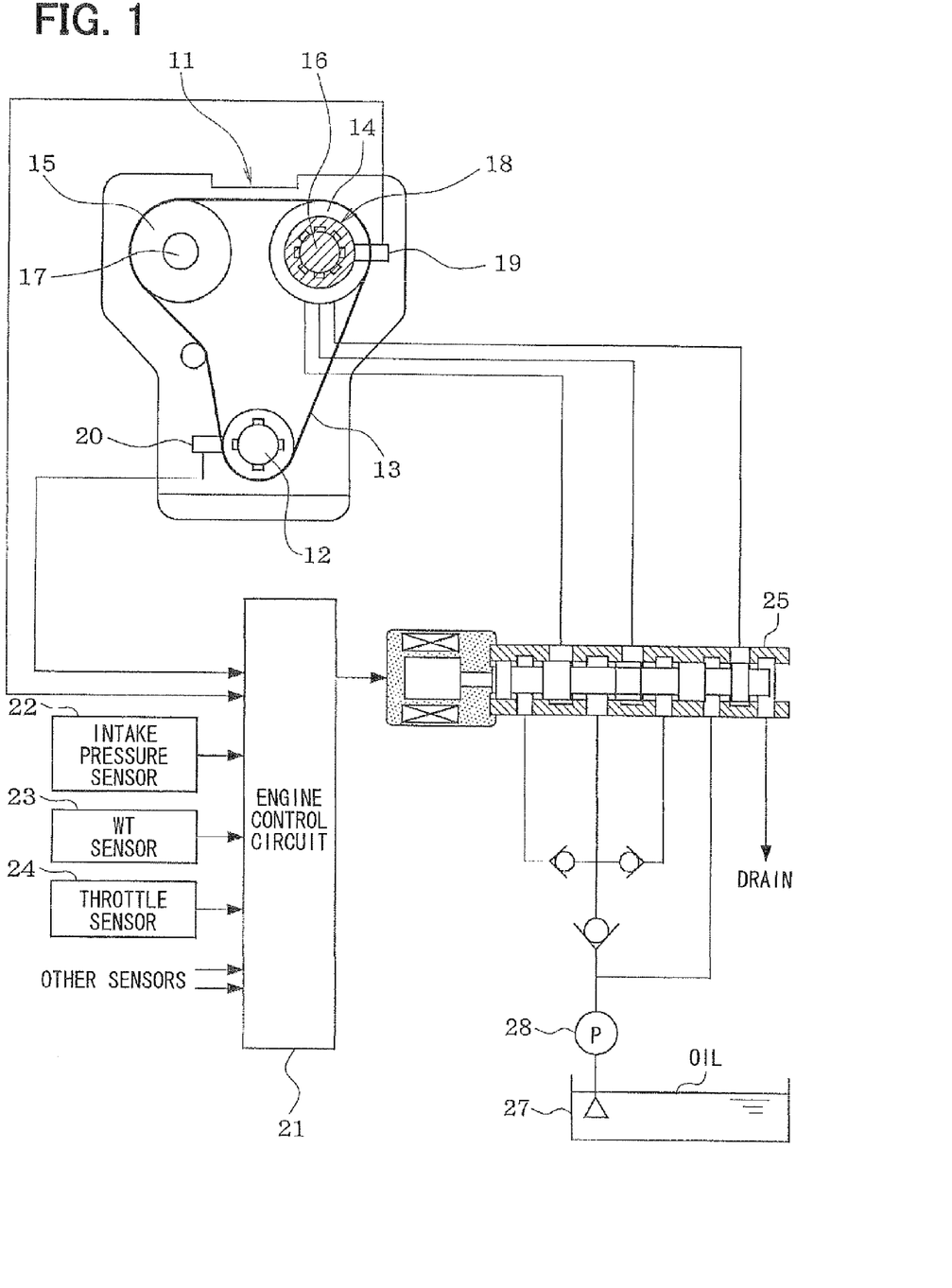
FIG. 1 is a schematic view illustrating an engine control system according to a first embodiment.

A first embodiment will be described with reference to FIGS. 1-7. As shown in FIG. 1, power is transmitted from a crankshaft 12 to an intake-side camshaft 16 and an exhaust-side camshaft 17 through respective sprocket 14, 15 by a timing chain 13, in an engine 11. The intake-side camshaft 16 has a variable valve timing device 18 to control an advance amount of the intake-side camshaft 16 with respect to the crankshaft 12, which is referred as variable cam timing (VCT) phase.

A cam sensor 19 is arranged on an outer circumference side of the intake-side camshaft 16, and outputs a pulse of cam angle signal by every predetermined cam angle. A crank sensor 20 is arranged on an outer circumference side of the crankshaft 12, and outputs a pulse of crank angle signal by every predetermined crank angle. Signals output from the sensors 19, 20 are input into an engine control circuit 21.

The engine control circuit 21 calculates an actual valve timing (actual VCT phase) of an intake valve (not shown) based on a phase difference between the pulse signal output from the cam sensor 19 and the pulse signal output from the crank sensor 20. Further, the circuit 21 calculates an engine rotation speed based on a frequency (interval) of the pulse output from the crank sensor 20. Other signals are input into the circuit 21 from sensors to detect engine operation state, such as intake pressure sensor 22, cooling water temperature (WT) sensor 23 or throttle sensor 24.

The engine control circuit 21 controls fuel injection and ignition according to the engine operation condition detected by the sensors, and performs a variable valve timing control (VCT phase feedback control). The circuit 21 performs a feedback control of oil pressure to drive the variable valve timing device 18 in a manner that an actual valve timing (VCT phase) of the intake valve coincides with a target valve timing (target phase) set in accordance with the engine operation state.

The variable valve timing device 18 is explained with reference to FIGS. 2-4. The sprocket 14 is rotatably supported by an outer periphery of the intake-side camshaft 16, and a housing 31 of the variable valve timing device 18 is tightened and fixed to the sprocket 14 with a bolt 32. Thereby, rotation of the crankshaft 12 is transmitted to the sprocket 14 and the housing 31 through the timing chain 13, so that the sprocket 14 and the housing 31 rotate in synchronization with the crankshaft 12.

A rotor 35 is tightened and fixed to one end of the intake-side camshaft 16 with a bolt 37. The rotor 35 is accommodated in the housing 31, and is rotatable relative to the housing 31.

Figure 3:
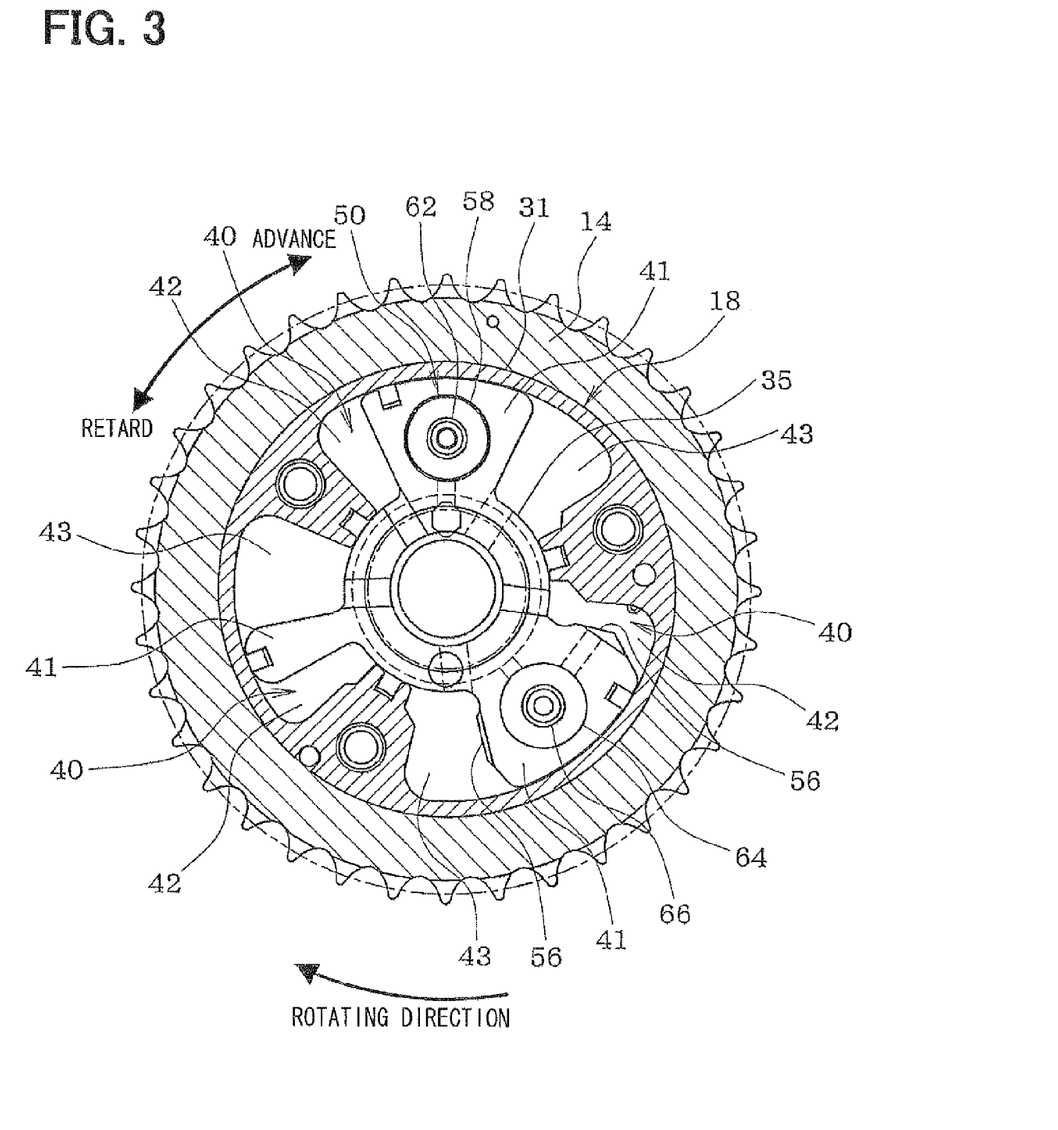
FIG. 3 is a schematic cross-sectional view illustrating the variable valve timing device.

As shown in FIG. 3, plural vane-accommodating chambers 40 are defined inside of the housing 31. The chamber 40 is divided into an advance chamber 42 and a retard chamber 43 by a vane 41 defined on an outer periphery of the rotor 35. A stopper 56 is defined on both sides of at least one vane 41, and restricts a relative rotation of the rotor 35 (vane 41) with respect to the housing 31. Due to the stopper 56, an actual VCT phase is controllable between most retard phase and most advance phase.

The variable valve timing device 18 has a middle lock mechanism 50 which locks the VCT phase at a middle lock phase located between the most retard phase and the most advance phase. For example, the middle lock phase is located approximately middle between the most retard phase and the most advance phase.

Figure 4:
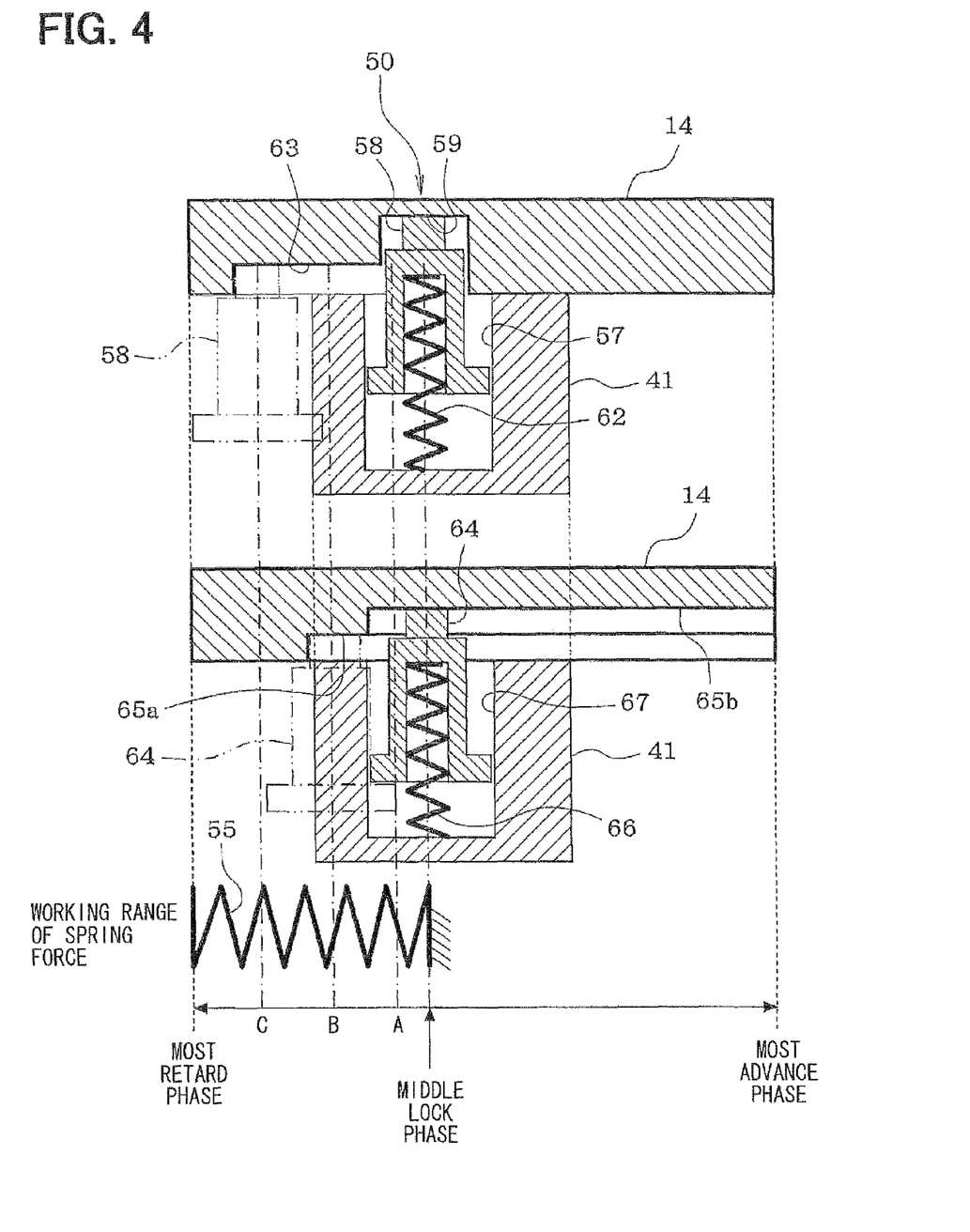
FIG. 4 is an explanatory view illustrating an advance restricting pin and a retard restricting pin of the engine control system.

As shown in FIG. 4, a hole 57 is defined in the vane 41, and a lock pin 58 is accommodated in the hole 57, in a projectable state. The lock pin 58 locks relative rotation between the housing 31 and the rotor 35 (vane 41). While the lock pin 58 is fitted to a lock hole 59 defined in the sprocket 14, the lock pin 58 projects toward the sprocket 14. Thus, the VCT phase is locked at the middle lock phase located approximately middle in the controllable range. The middle lock phase is set suitably for startup of the engine 11. The lock hole 59 may be defined in the housing 31, alternatively.

The lock pin 58 is biased into a lock direction (projection direction) by a spring 62 so as to lock the VCT phase. Moreover, an unlock chamber is defined between an outer periphery of the lock pin 58 and the hole 57, and controls an oil pressure which drives the lock pin 58 into an unlock direction (retreat direction) so as to unlock the VCT phase.

The lock pin 58 is an advance restricting pin that limits an advance movement of the VCT phase past the middle lock phase while the VCT phase is controlled on the retard side from the middle lock phase. An advance restricting groove 63 continuously extends from the lock hole 59 to a predetermined phase C located adjacent to the most retard phase. A depth of the groove 63 is smaller than that of the lock hole 59. When the lock pin 58 is fitted with the groove 63, the VCT phase is limited to move within a range between the middle lock phase and the predetermined phase C.

If a target phase is set adjacent to the most retard phase past the phase C, the lock pin 58 is retreated from the groove 63 by oil pressure, so that the VCT phase can be moved toward the most retard phase.

If a target phase is set on the advance side from the middle lock phase, the lock pin 58 is completely retreated from the groove 63 by oil pressure, so that the VCT phase can be moved to the advance side from the middle lock phase.

Similarly, a retard restricting pin 64 and retard restricting grooves 65*a*, 65*b* are provided for preventing the VCT phase from moving into the retard side while the VCT phase is controlled on the advance side. The retard restricting pin 64 is biased to a projection direction by a spring 66. Moreover, an oil pressure chamber is defined between an outer periphery of the retard restricting pin 64 and a hole 67 that accommodates the pin 64. The oil pressure chamber controls an oil pressure which drives the pin 64 into a retreat direction. The pin 64 is fitted to one of the grooves 65*a*, 65*b* by the spring 66, thereby a controllable range of the VCT phase on the advance side is limited by two-step, for example.

One of the grooves 65*a*, 65*b* may be omitted, or the number of the grooves may be set three or more. The controllable range of the VCT phase limited by the advance restricting groove or the retard restricting groove may be suitably modified.

In FIG. 4, the retard restricting groove 65*a* extends from the most advance phase to a predetermined phase B past the middle lock phase. The retard restricting groove 65*b* extends from the most advance phase to a predetermined phase A past the middle lock phase. Therefore, at the middle lock phase, the lock pin 58 is fitted with the lock hole 59, and the pin 64 is fitted with the groove 65*b* deeper than the groove 65*a*.

Figure 2:
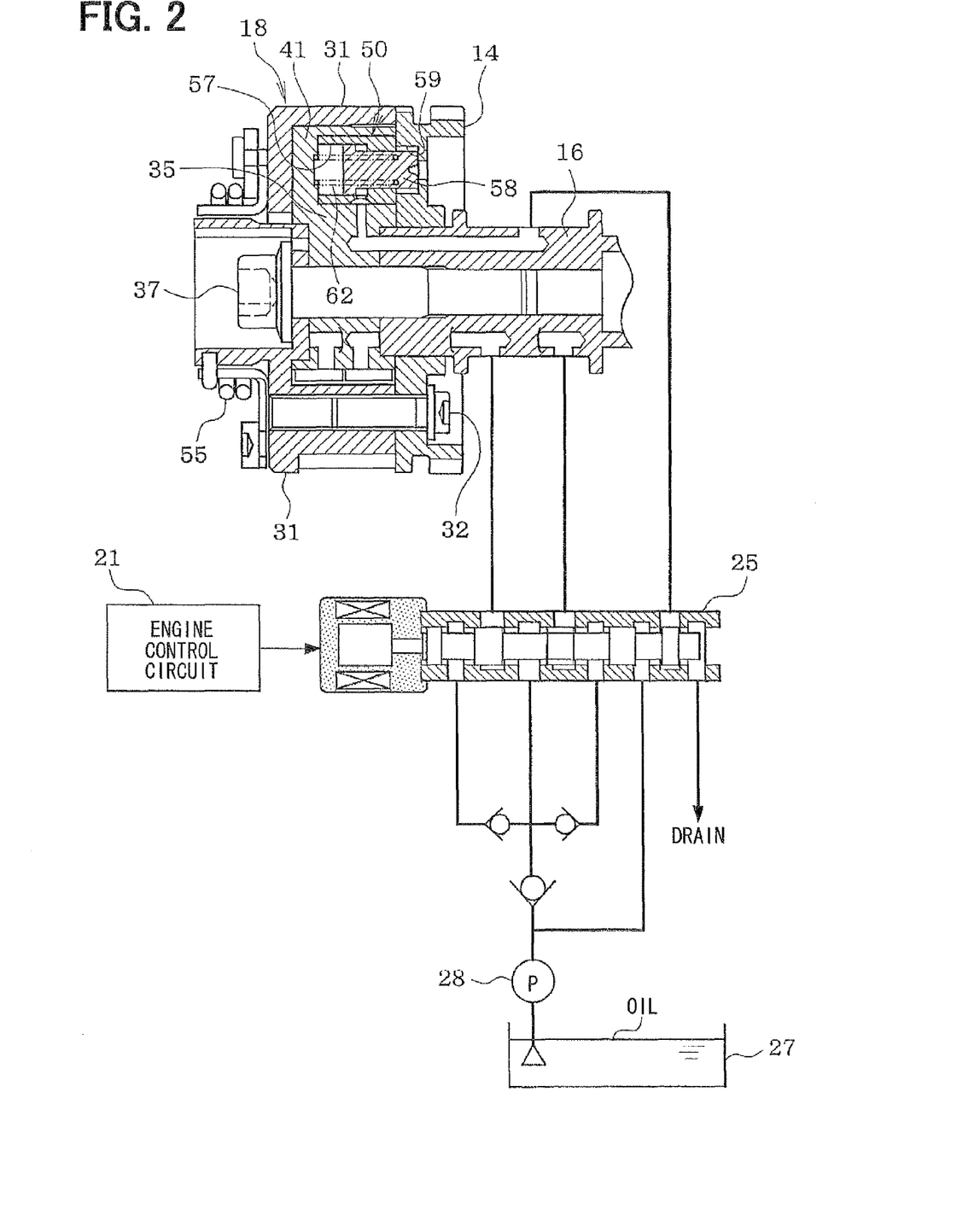
FIG. 2 is a schematic view illustrating a variable valve timing device and an oil pressure control circuit of the engine control system.

As shown in FIG. 2, a spring 55 such as torsion coil spring is provided in the housing 31. A force of the spring 55 supports and assists oil pressure that relatively rotates the rotor 35 in the advance direction. In the timing device 18 of the intake valve, a torque of the intake-side camshaft 16 is applied so as to retard the VCT phase, so that the spring 55 biases the VCT phase into the advance direction that is opposite from the torque direction of the intake-side camshaft 16.

As shown in FIG. 4, a working range of the biasing force of the spring 55 is set approximately between the most retard phase and the middle lock phase, considering a fail-safe at engine restarting time after the engine is stopped by abnormality such as engine stall. If the engine is started in a state where the lock pin 58 is not fitted to the lock hole 59, the lock pin 58 becomes fitted with the lock hole 59 during a cranking of a starter (not shown). That is, the VCT phase is assisted to advance from the retard side by the force of the spring 55 so as to achieve the lock of the VCT phase, even if the VCT phase is located on the retard side from the middle lock phase when the engine is started.

In contrast, if the engine is started in a state where the VCT phase is located on the advance side from the middle lock phase, the VCT phase is retarded from the advance side to the middle lock phase by a torque of the intake-side camshaft 16, because the torque of the intake-side camshaft 16 is applied in the retard direction during the cranking. Thus, the lock pin 58 becomes fitted with the lock hole 59 so that the lock of the VCT phase is achieved.

An oil pressure control valve 25 (OCV) integrally controls the VCT phase of the timing device 18, and the pins 58, 64 through oil pressure. The OCV 25 controls an oil pressure that drives the VCT phase and an oil pressure that drives the lock pin 58. That is, the OCV 25 controls both of the phase and the lock.

As shown in FIG. 2, an oil pump 28 is driven by the engine 11, and working oil is pumped and supplied by the pump 28 from an oil pan 27 to the OCV 25. The OCV 25 may be 8-port and 4-position type spool valve, for example.

Figure 5:
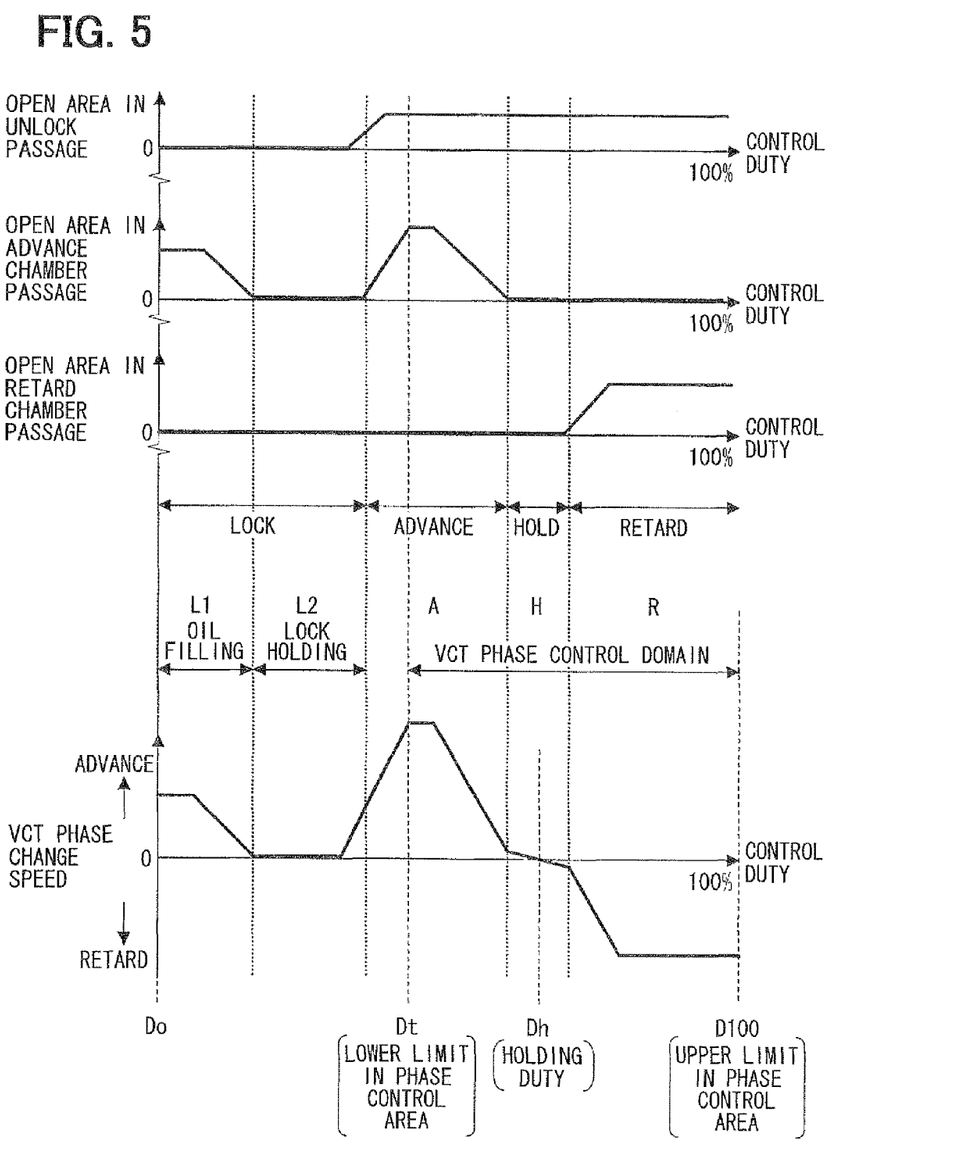
FIG. 5 is a view illustrating control characteristics of an oil pressure control valve of the engine control system.

As shown in FIG. 5, a control status of the OCV 25 is separated into lock mode L1, L2, advance mode A, hold mode H and retard mode R, in accordance with a control duty of the OCV 25.

In the lock mode L1, L2, an oil supply passage that extends to the unlock chamber defined in the hole 57 is shut, so that oil pressure in the unlock chamber is lowered. Thus, the lock pin 58 is projected in the lock direction by the spring 62. Further, an oil supply passage that extends to the oil pressure chamber defined in the hole 67 is shut, so that oil pressure in the oil pressure chamber is lowered. Thus, the retard restricting pin 64 is projected by the spring 66.

The lock mode has an oil filling mode L1 and a lock holding mode L2. In the oil filling mode L1, the pins 58, 64 are projected, and an oil supply passage extending to the advance chamber 42 is opened, so that oil is supplied to the advance chamber 42.

In the lock holding mode L2, the pins 58, 64 are projected, and the oil supply passage extending to the advance chamber 42 and an oil supply passage extending to the retard chamber 43 are shut, so that oil pressure in the chamber 42, 43 is maintained.

In the advance mode A, the oil supply passage extending to the retard chamber 43 is shut, and a retard port of the OCV 25 is made to communicate with a drain port, so that the oil pressure in the retard chamber 43 is lowered. In this state, the oil supply passage extending to the advance chamber 42 is opened in accordance with control duty of the OCV 25. Thus, oil is supplied to the advance chamber 42, and the oil pressure in the advance chamber 42 is changed, so that the actual VCT phase is advanced.

In the hold mode H, the oil supply passage extending to the advance chamber 42 and the oil supply passage extending to the retard chamber 43 are shut, so that the oil pressure in the chamber 42, 43 is maintained. Thus, the actual VCT phase is maintained.

In the retard mode R, the oil supply passage extending to the advance chamber 42 is shut, and an advance port of the OCV 25 is made to communicate with the drain port, so that the oil pressure in the advance chamber 42 is lowered. In this state, the oil supply passage extending to the retard chamber 43 is opened in accordance with control duty of the OCV 25. Thus, oil is supplied to the retard chamber 43, and the oil pressure in the retard chamber 43 is changed, so that the actual VCT phase is retarded.

In the modes A, H, R other than the lock mode L1, L2, the oil supply passage extending to the unlock chamber defined in the hole 57 is opened, and oil is filled in the unlock chamber, so that the oil pressure in the unlock chamber is raised. Due to the raised oil pressure, the lock pin 58 is retreated from the lock hole 59, thereby unlocking the VCT phase through the pin 58.

Further, the oil supply passage extending to the oil pressure chamber defined in the hole 67 is opened, and oil is filled in the oil pressure chamber defined in the hole 67, so that the oil pressure in the oil pressure chamber defined in the hole 67 is raised. Due to the raised oil pressure, the pin 64 is retreated from the groove 65a, 65b.

Control status is switched in order of the lock mode L1, L2, the advance mode A, the hold mode H, and the retard mode R, as the control duty of the OCV 25 is made larger.

For example, control status may be switched in order of the retard mode R, the hold mode H, the advance mode A, and the lock mode L1, L2, as the control duty of the OCV 25 is made larger.

Alternatively, control status may be switched in order of the lock mode L1, L2, the retard mode R, the hold mode H, and the advance mode A.

The engine control circuit 21 may correspond to a VCT phase controller. When a predetermined condition for learning a reference phase is satisfied, the circuit 21 controls the variable valve timing device 18 to maintain an actual VCT phase of the intake-side camshaft 16 to a reference position such as most retard phase or middle lock phase, for example. The reference phase is learned by memorizing a phase difference between pulse output from the cam sensor 19 and pulse output from the crank sensor 20 in rewritable non-volatile memory such as backup RAM (not shown) of the circuit 21. Even when the circuit 21 is not active, the memorized data is kept.

Further, when the predetermined condition for learning the reference phase is satisfied, an actual VCT phase (e.g., advance amount from the reference phase) of the intake-side camshaft 16 is computed based on the phase difference of the pulses output from the cam sensor 19 and the crank sensor 20, and a target phase is set according to engine operation condition. The circuit 21 performs feedback (FIB) control of the control duty (control amount) of the OCV 25, for example, by PD control etc, in a manner that the actual VCT phase (actual valve timing of the intake valve) of the intake-side camshaft 16 coincides with the target phase (target valve timing of the intake valve). That is, a VCT phase control represents the FIB control performed relative to the pressure of oil supplied to the advance chamber 42 and the retard chamber 43 of the variable valve timing device 18. As shown in FIG. 5, a control domain of the VCT phase control is straddling the retard mode R, the hold mode H, and the advance mode A.

If a lock requirement is generated while the engine 11 is stopped or idled, the circuit 21 performs the VCT phase control, so that the VCT phase is moved to a target phase past the middle lock phase by a predetermined phase using FIB control such as PD control. Then, the control duty of the OCV 25 is set in a control domain of the lock mode. The VCT phase is returned toward the middle lock phase, and the lock pin 58 is biased to project in the projection direction corresponding to the lock direction. Thus, the VCT phase is locked at the middle lock phase by the lock pin 58.

Figure 6:
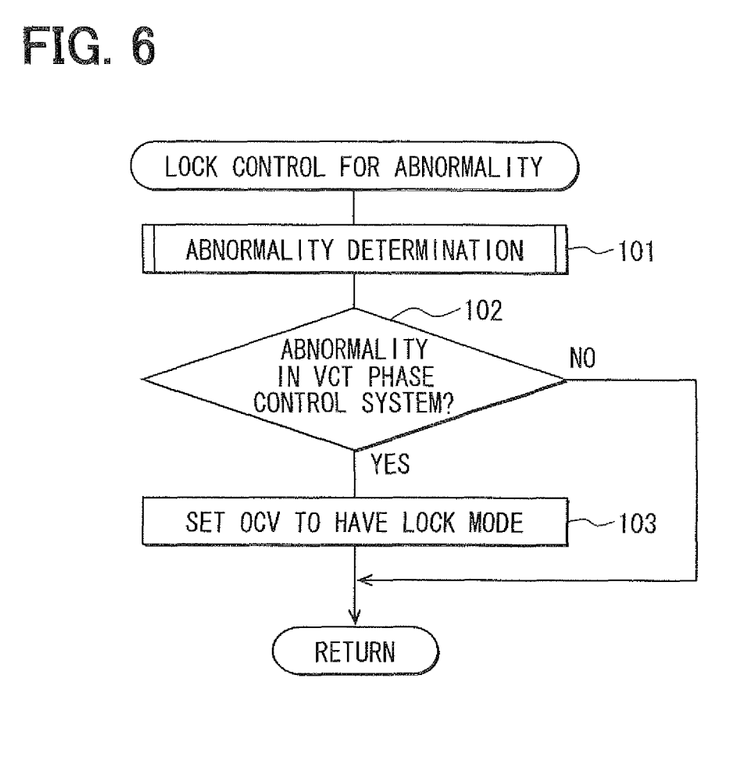
FIG. 6 is a flow chart illustrating a lock control for abnormality.
Figure 7:
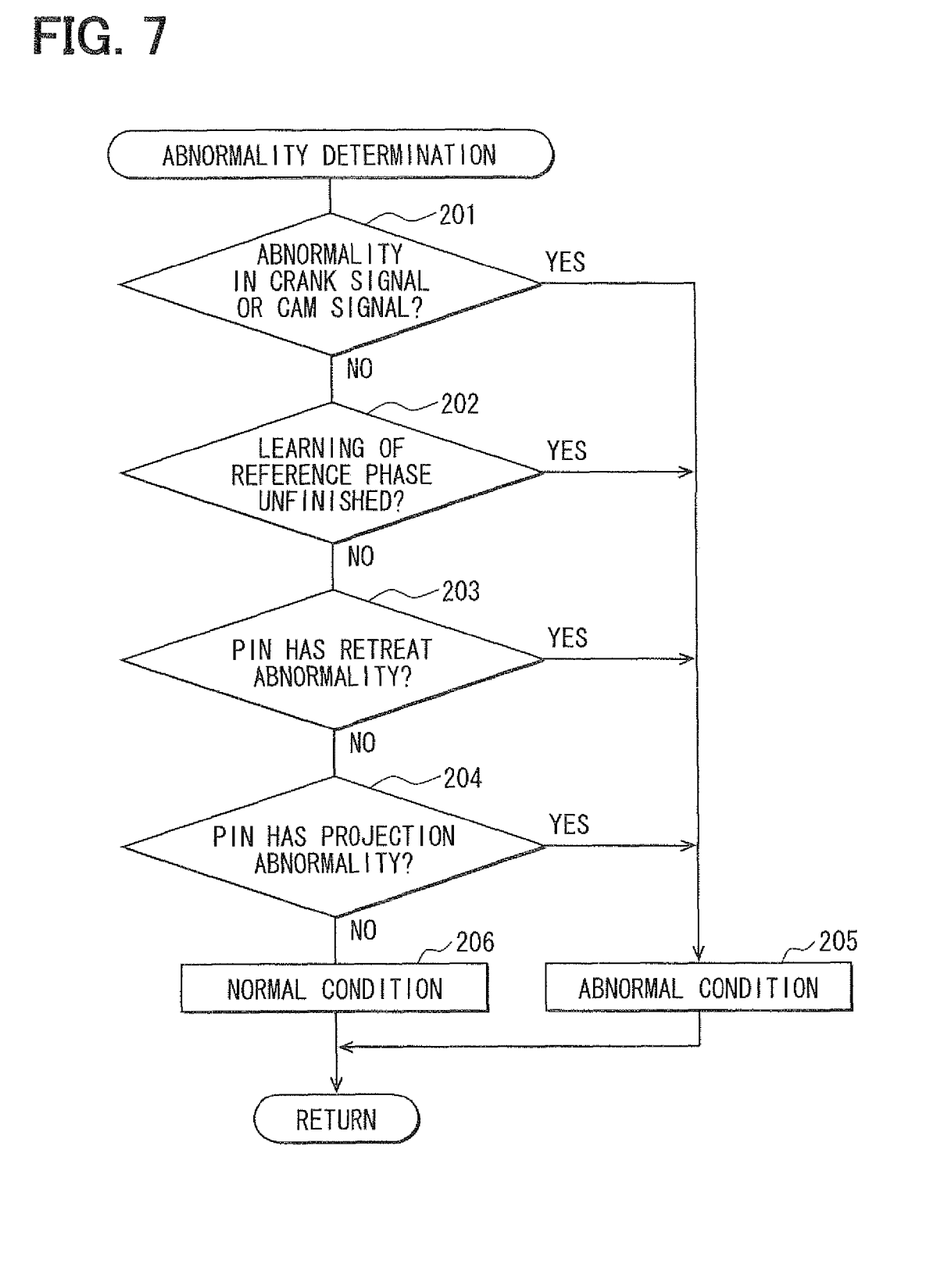
FIG. 7 is a flow chart illustrating an abnormality determination.

Moreover, the engine control circuit 21 performs a routine of FIG. 6 and a routine of FIG. 7. Specifically, existence of malfunction in the VCT phase control system is determined. When it is determined that there is abnormality in the VCT phase control system, the control duty of the OCV 25 is set in the control domain of the lock mode such as L2. For example, the lock pin 58 is driven in the lock direction by setting the control amount of the OCV 25. Even if the VCT phase cannot be controlled by the abnormality, the VCT phase can be locked by the lock pin 58 when the VCT phase becomes the middle lock phase until the engine is stopped. The routine performed by the circuit 21 will be described with reference to FIGS. 6 and 7.

(Lock Control for Abnormality)

The routine of FIG. 6 is repeatedly performed with a predetermined cycle while the circuit 21 is active, and may correspond to a valve controller for abnormality. If the routine is started, an abnormality determination of FIG. 7 to be mentioned later will be first performed at Step 101, in which abnormality is determined to exist or not in the VCT phase control system. At Step 102, it is determined whether there is abnormality in the VCT phase control system based on the result of abnormality determination (Step 101). When it is determined that there is no malfunction in the VCT phase control system, the routine is ended without processing Step 103.

If it is determined that there is abnormality in the VCT phase control system at Step 102, the control duty of the OCV 25 is set to have the lock mode such as L2 at Step 103 regardless of a position of the VCT phase, so that the pins 58, 64 are driven to the lock direction so as to lock the VCT phase, (Abnormality Determination)

The routine of FIG. 7 is a subroutine performed at Step 101 of FIG. 6, and may correspond to an abnormality determining portion. When the routine is activated, it is determined whether there is abnormality in the crank signal or the cam signal at Step 201. For example, if there is a break in a signal line that transmits the crank signal or the cam signal, it is determined that there is abnormality.

If it is determined that there is abnormality in at least one of the crank signal and the cam signal at Step 201, the VCT phase control cannot be performed because the actual VCT phase cannot be calculated. Then, it is determined that there is abnormality in the control system at Step 205.

If it is determined that both of the crank signal and the cam signal are normal at Step 201, it is determined whether learning of the reference phase is unfinished in a present engine operation at Step 202.

If it is determined that the learning of the reference phase is unfinished in the present engine operation at Step 202, the VCT phase control cannot be started because the reference phase necessary for calculating the VCT phase is not learned. Then, it is determined that there is abnormality in the control system at Step 205.

If it is determined that the learning of the reference phase is finished in the present engine operation at Step 202, it is determined whether the pin 58, 64 has retreat abnormality at Step 203. For example, when the pin 58, 64 sticks to a retreat position, the pin 58, 64 cannot project. The retreat position of the lock pin 58 is a position at which the lock pin 58 is located in the hole 57. The retreat position of the lock pin 64 is a position at which the lock pin 64 is located in the hole 67.

If the actual VCT phase is changed on the advance side or the retard side from the range limited by the groove 63 while the lock pin 58 is controlled to project (e.g., when an oil pressure applied to the lock pin 58 is lower than a predetermined value), the lock pin 58 is determined to have the retreat abnormality.

If the actual VCT phase is changed on the advance side or the retard side from the range limited by the groove 65a while the lock pin 64 is controlled to project (e.g., when an oil pressure applied to the lock pin 64 is lower than a predetermined value), the lock pin 64 is determined to have the retreat abnormality. A method of determining whether the pin 58, 64 has the retreat abnormality may be suitably modified.

If it is determined that the pin 58, 64 has the retreat abnormality at Step 203, it is determined that there is abnormality in the control system at Step 205.

If it is determined that both of the pins 58, 64 do not have the retreat abnormality at Step 203, it is determined whether the pin 58, 64 has projection abnormality at Step 204. For example, when the pin 58, 64 sticks to a projection position, the pin 58, 64 cannot retreat. The projection position of the lock pin 58 is a position at which the lock pin 58 is fitted with the hole 59 or the groove 63. The project position of the lock pin 64 is a position at which the lock pin 64 is fitted with the groove 65a or the groove 65b.

If the actual VCT phase cannot be changed on the advance side or the retard side from the range limited by the groove 63 while the lock pin 58 is controlled to retreat (e.g., when an oil pressure applied to the lock pin 58 is equal to or higher than a predetermined value), the lock pin 58 is determined to have the projection abnormality.

If the actual VCT phase cannot be changed on the advance side or the retard side from the range limited by the groove 65a while the lock pin 64 is controlled to retreat (e.g., when an oil pressure applied to the lock pin 64 is equal to or higher than a predetermined value), the lock pin 64 is determined to have the projection abnormality. A method of determining whether the pin 58, 64 has the projection abnormality may be suitably modified.

If it is determined that at least one of the pins 58, 64 has the projection abnormality at Step 204, it is determined that there is abnormality in the control system at Step 205.

If it is determined that both of the pins 58, 64 do not have the projection abnormality at Step 204, that is, if all step 201-204 has determination of "No", it is determined that there is no abnormality in the VCT phase control system at Step 206.

According to the first embodiment, when the VCT phase control cannot be performed, it is determined that there is abnormality in the VCT phase control system, and the OCV 25 is set to have the lock mode L2. Therefore, even if the VCT phase control cannot be performed, when the VCT phase coincides with the middle lock phase before the engine is stopped, the VCT phase can be locked by projecting the lock pin 58 in the lock direction. Thus, the next startup property of the engine 11 can be secured.

Further, when the restricting pin 58, 64 has the retreat abnormality or the projection abnormality, it is determined that there is abnormality in the VCT phase control system, and the OCV 25 is set to have the lock mode L2. Therefore, the VCT phase can be limited or locked by projecting the pins (including the lock pin 58) as much as possible. Thus, strange sound, wear or breakage can be reduced.

The present invention may be applied to a system having a variable valve timing device of an exhaust valve in place of the intake valve. Further, the VCT phase may be locked into most retard phase or most advance phase in the controllable range of the VCT phase without being limited into the middle lock phase.

(Second Embodiment)

A second embodiment will be described with reference to FIGS. 8 and 9. Substantially the same parts as the first embodiment are omitted or simplified, and parts different from the first embodiment will be described.

Figure 8:
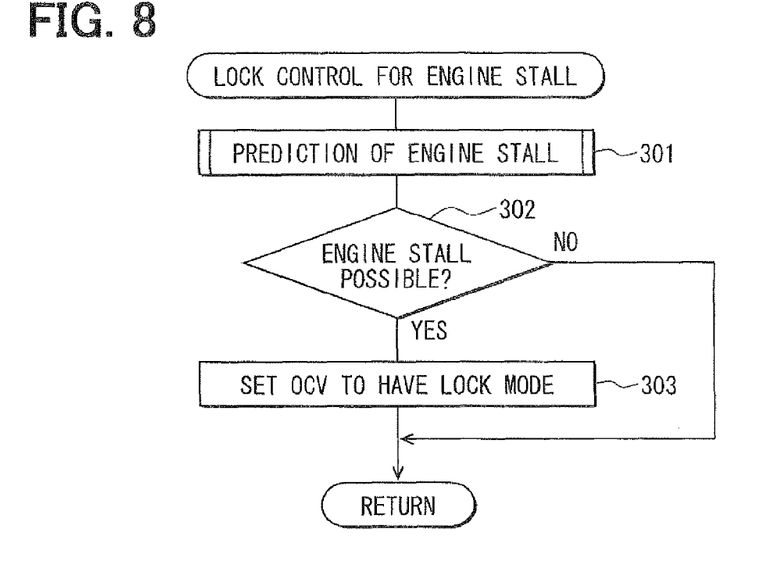
FIG. 8 is a flow chart illustrating a lock control for engine stall according to a second embodiment.
Figure 9:
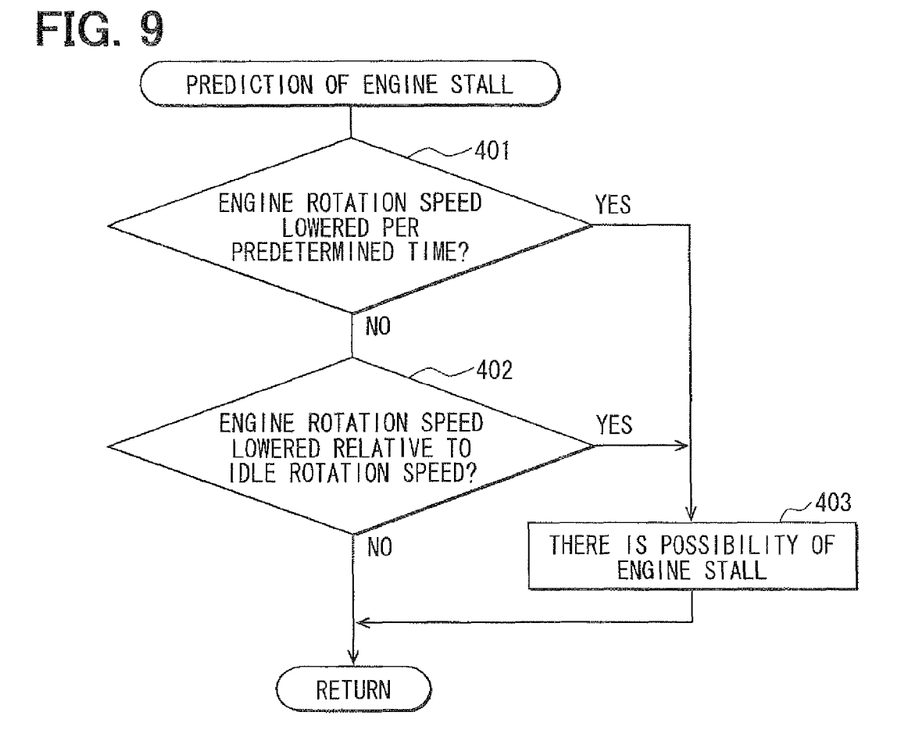
FIG. 9 is a flow chart illustrating a prediction of engine stall of the second embodiment.

A routine of FIG. 8 and a routine of FIG. 9 are performed by the engine control circuit 21, so as to predict a generation of engine stall. Further, if the engine stall is predicted to occur, the control duty of the OCV 25 is set to have the lock holding mode L2 regardless of a position of the VCT phase. Thus, the lock pin 58 and the retard restricting pin 64 are driven to the lock direction so as to lock the VCT phase.

(Lock Control for Engine Stall)

The routine of FIG. 8 is repeatedly performed with a predetermined cycle while the circuit 21 is active, and may correspond to a valve controller for engine stall. If the routine is started, a routine of predicting the engine stall (FIG. 9) to be men tioned later will be first performed at Step 301, in which engine stall is predicted to happen or not. At Step 302, it is determined whether a stall will be generated in the engine based on the result of engine stall prediction determination (Step 301). When it is determined that the engine stall is not generated, the routine is ended without processing Step 303.

If it is determined that the engine stall is generated at Step 302, the control duty of the OCV 25 is set to have the lock mode such as L2 at Step 303 regardless of the VCT phase, so that the pins 58, 64 are driven to the lock direction.

(Prediction of Engine Stall)

The routine of FIG. 9 is a subroutine performed at Step 301 of FIG. 8, and may correspond to an engine stall predicting portion. When the routine is activated, it is determined whether a lowering amount in the engine rotation speed per unit time is equal to or higher than a predetermined value at Step 401. Specifically, for example, a lowering rate (speed) in the engine rotation speed is determined to be equal to or higher than a predetermined value, or not.

Further, it is determined whether a lowering amount (rate) in the engine rotation speed relative to an engine-idling-time rotation speed is equal to or higher than a predetermined value at Step 402. Specifically, for example, a difference between the engine-idling-time rotation speed and the present engine rotation speed is determined to be equal to or higher than a predetermined value, or not.

If Step 401 is determined as Yes (e.g., if the engine rotation speed is rapidly lowered), or if Step 402 is determined as Yes (e.g., if the engine rotation speed is lowered largely compared with the idling rotation speed), it is determined that there is high possibility that the engine stall is generated at Step 403.

In contrast, if Step 401 is determined as No and if Step 402 is determined as No, the routine of FIG. 9 is ended because there is no possibility that the engine stall is generated.

If the engine stall is generated, the engine 11 will be stopped in short time without a command for stopping the engine. However, according to the second embodiment, the control duty of the OCV is set to have the lock holding mode L2 when the generation of the engine stall is predicted. Therefore, when the VCT phase coincides with the middle lock phase before the engine is stopped, the lock pin 58 is made to project in the lock direction so as to lock the VCT phase. Thus, predetermined engine startup property can be secured at the next engine startup time.

In a system having the timing device 18 of the intake valve, when the engine stall is generated, the engine 11 may be stopped in a state where the VCT phase coincides with the most retard phase (where the valve timing of the intake valve is located at the most retard position). In this case, engine startup property may become worse at the next engine startup time. Especially in a case of low temperature, the engine 11 may not be able to be started.

Therefore, when the generation of the engine stall is predicted, the control amount of the OCV may be set to have the advance mode A, or the oil filling mode L1.

In the advance mode A, the VCT phase is driven in the advance direction. At this time, the control amount of the OCV may be set to make an advance speed of the VCT phase to become the maximum in the advance mode A.

In the oil filling mode L1, the OCV is controlled in a manner that the lock pin 58 is driven in the lock direction and that the VCT phase is driven in the advance direction. At this time, the control amount of the OCV may be set to make an advance speed of the VCT phase to become the maximum in the oil filling mode L1.

In these cases, the VCT phase can be advanced at least from the most retard phase before the engine is stopped. Therefore, the VCT phase can be restricted from stopping in the state where the VCT phase coincides with the most retard phase when the engine is stopped. Thus, the startup property of the engine can be restricted from becoming worse at the next startup time.

The second embodiment is applied in the system having the variable valve timing device 18 of the intake valve. Alternatively, the second embodiment may be applied in a system having a variable valve timing device of an exhaust valve. In this case, when the VCT phase coincides with the middle lock phase before the engine is stopped, the lock pin is made to project in the lock direction so as to lock the VCT phase. Thus, the engine startup property can be secured at the next engine startup time.

In the system having the variable valve timing device of the exhaust valve, when the engine stall is generated, the engine 11 may be stopped in a state where the VCT phase coincides with the most advance phase (where the valve timing of the exhaust valve is located at the most advance position). In this case, engine startup property may become worse at the next engine startup time, or drivability may become worse when the engine is restarted.

When the generation of the engine stall is predicted, the control amount of the OCV may be set to have the retard mode, or the oil filling mode.

In the retard mode, the VCT phase may be driven in the retard direction. At this time, the control amount of the OCV may be set to make a retard speed of the VCT phase to become the maximum in the retard mode.

In the oil filling mode, the OCV is controlled in a manner that the lock pin is driven in the lock direction and that the VCT phase is driven in the retard direction. At this time, the control amount of the OCV may be set to make a retard speed of the VCT phase to become the maximum in the oil filling mode.

In these cases, the VCT phase can be retarded at least from the most advance phase before the engine is stopped. Therefore, the VCT phase can be restricted from stopping in the state where the VCT phase coincides with the most advance phase when the engine is stopped. Thus, the startup property of the engine can be restricted from becoming worse at the next startup time, and drivability can be restricted from becoming worse when the engine is restarted.

(Other Embodiment)

The lock pin is not limited to be constructed by the advance restricting pin. Alternatively, the lock pin may be constructed by the retard restricting pin or may be constructed by both of the advance restricting pin and the retard restricting pin.

Further, the oil pressure control valve for controlling the oil pressure that drives the VCT phase may be separated from the oil pressure control valve for controlling the oil pressure that drives the lock pin or the restricting pin.

Constructions of the variable valve timing device and the oil pressure control valve may be modified suitably. The first embodiment and the second embodiment may be combined with each other.

Such changes and modifications are to be understood as being within the scope of the present invention as defined by the appended claims.

What is claimed is:

1. A variable valve timing control apparatus comprising:
a variable valve timing device that controls valve timing of an intake valve or exhaust valve by changing a rotation phase of a camshaft with respect to a crankshaft in an engine, the rotation phase of the camshaft with respect to the crankshaft being defined as a VCT phase;
a plurality of restricting pins to limit the VCT phase, wherein at least one of the plurality of restricting pins is a lock pin to lock the VCT phase at a predetermined lock phase positioned in a controllable range of the VCT phase, and wherein the predetermined lock phase is a middle lock phase located between a most retard phase and a most advance phase in the controllable range of the VCT phase;
an oil pressure control valve to control an oil pressure that drives the variable valve timing device and each of the plurality of restricting pins; and
a control circuit configured to include:
a VCT phase controller configured to perform a VCT phase control in which the oil pressure control valve is controlled in a manner that an actual VCT phase coincides with a target phase;
an abnormality determining portion configured to determine whether there is an abnormality in a system of the VCT phase control, wherein the abnormality determining portion is configured to determine that there is an abnormality in the system of the VCT phase control when at least one of the plurality of restricting pins is incapable to have normal projection to lock the VCT phase while the plurality of restricting pins is controlled to project so as to limit the VCT phase;
and
a valve controller configured to control a control amount of the oil pressure control valve so as to drive the lock pin in a locking direction to lock the VCT phase regardless of the VCT phase when the abnormality determining portion determines that there is an abnormality in the system of the VCT phase control, wherein the valve controller controls the control amount of the oil pressure control valve so as to drive the plurality of restricting pins in a projecting direction to lock the VCT phase when the abnormality determining portion determines that there is an abnormality in the system of the VCT phase control.

2. The variable valve timing control apparatus according to claim 1, wherein the control circuit is further configured to include:
an engine stall predicting portion configured to predict whether a stall will be generated in the engine, wherein the variable valve timing device controls valve timing of the intake valve, and
the control circuit configured to include the valve controller controls the control amount of the oil pressure control valve regardless of the VCT phase (i) so as to drive the lock pin in a locking direction to lock the VCT phase or/and (ii) so as to drive the VCT phase in an advance direction, when the engine stall predicting portion predicts that a stall will be generated in the engine.

3. The variable valve timing control apparatus according to claim 2, wherein
the control circuit configured to include the engine stall predicting portion predicts the generation of the engine stall when a lowering in a rotation speed of the engine relative to an idling-time rotation speed of the engine becomes equal to or larger than a predetermined value.

4. The variable valve timing control apparatus according to claim 2, wherein
the control circuit configured to include the engine stall predicting portion predicts the generation of the engine stall when a lowering in a rotation speed of the engine per unit period becomes equal to or larger than a predetermined value.

5. The variable valve timing control apparatus according to claim 1, wherein the control circuit is further configured to include:
an engine stall predicting portion to predict whether a stall will be generated in the engine, wherein
the variable valve timing device controls valve timing of the exhaust valve, and
the control circuit configured to include the valve controller controls the control amount of the oil pressure control valve regardless of the VCT phase (i) so as to drive the lock pin in a locking direction to lock the VCT phase or/and (ii) so as to drive the VCT phase in a retard direction, when the engine stall predicting portion predicts that a stall will be generated in the engine.

6. The variable valve timing control apparatus according to claim 5, wherein
the control circuit configured to include the engine stall predicting portion predicts the generation of the engine stall when a lowering in a rotation speed of the engine relative to an idling-time rotation speed of the engine becomes equal to or larger than a predetermined value.

7. The variable ,valve timing control apparatus according to claim 5, wherein
the control circuit configured to include the engine stall predicting portion predicts the generation of the engine stall when a lowering in a rotation speed of the engine per unit period becomes equal to or larger than a predetermined value.

8. The variable valve timing control apparatus according to claim 1, wherein
the control circuit configured to include the VCT phase controller has means for calculating the actual VCT phase based on a crank angle signal and a cam angle signal, and
the control circuit configured to include the abnormality determining portion determines that there is an abnormality in the system of the VCT phase control when the calculating means is incapable of calculating the actual VCT phase due to an abnormality in the crank angle signal or the cam angle signal.

9. The variable valve timing control apparatus according to claim 1, wherein
the control circuit configured to include the VCT phase controller has means for learning a reference phase corresponding to a reference position of the VCT phase in a calculation of the actual VCT phase, and
the control circuit configured to include the abnormality determining portion determines that there is an abnormality in the system of the VCT phase control when the VCT phase control is unable to be started due to incompleteness in the learning of the reference phase.

10. A variable valve timing control apparatus comprising:
a variable valve timing device that controls valve timing of an intake valve or exhaust valve by changing a rotation phase of a camshaft with respect to a crankshaft in an engine, the rotation phase of the camshaft with respect to the crankshaft being defined as a VCT phase;

a plurality of restricting pins to limit the VCT phase, at least one of the plurality of restricting pins being a lock pin to lock the VCT phase at a predetermined lock phase positioned in a controllable range of the VCT phase;

an oil pressure control valve to control an oil pressure that drives the variable valve timing device and each of the plurality of the restricting pins; and a control circuit configured to include
a VCT phase controller configured to perform a VCT phase control in which the oil pressure control valve is controlled in a manner that an actual VCT phase coincides with a target phase;
an abnormality determining portion configured to determine whether there is an abnormality in a system of the VCT phase control, wherein the abnormality determining portion determines that there is an abnormality in the system of the VCT phase control when at least one of the plurality of restricting pins is incapable to have normal retreat to unlock the VCT phase while the plurality of restricting pins is controlled to retreat so as to unlock the VCT phase; and
a valve controller configured to control a control amount of the oil pressure control valve so as to drive the lock pin in a locking direction to lock the VCT phase regardless of the VCT phase when the abnormality determining portion determines that there is an abnormality in the system of the VCT phase control, wherein the valve controller controls the control amount of the oil pressure control valve so as to drive the plurality of restricting pins in a projection direction to lock the VCT phase when the abnormality determining portion determines that there is an abnormality in the system of the VCT phase control.

11. The variable valve timing control apparatus according to claim 10, wherein the control circuit is further configured to include:
an engine stall predicting portion to predict whether a stall will be generated in the engine, wherein
the variable valve timing device controls valve timing of the exhaust valve, and
the control circuit configured to include the valve controller controls the control amount of the oil pressure control valve regardless of the VCT phase (i) so as to drive the lock pin in a locking direction to lock the VCT phase or/and (ii) so as to drive the VCT phase in a retard direction, when the engine stall predicting portion predicts that a stall will be generated in the engine.

12. The variable valve timing control apparatus according to claim 11, wherein
the control circuit configured to include the engine stall predicting portion predicts the generation of the engine stall when a lowering in a rotation speed of the engine relative to an idling-time rotation speed of the engine becomes equal to or larger than a predetermined value.

13. The variable valve timing control apparatus according to claim 11, wherein
the control circuit configured to include the engine stall predicting portion predicts the generation of the engine stall when a lowering in a rotation speed of the engine per unit period becomes equal to or larger than a predetermined value.

14. The variable valve timing control apparatus according to claim 10, wherein the control circuit is further configured to include:
an engine stall predicting portion to predict whether a stall will be generated in the engine, wherein
the variable valve timing device controls valve timing of the intake valve, and
the control circuit configured to include the valve controller controls the control amount of the oil pressure control valve regardless of the VCT phase (i) so as to drive the lock pin in a locking direction to lock the VCT phase or/and (ii) so as to drive the VCT phase in an advance direction, when the engine stall predicting portion predicts that a stall will be generated in the engine.

15. The variable valve timing control apparatus according to claim 14, wherein
the control circuit configured to include the engine stall predicting portion predicts the generation of the engine stall when a lowering in a rotation speed of the engine per unit period becomes equal to or larger than a predetermined value.

16. The variable valve timing control apparatus according to claim 10, wherein
the control circuit configured to include the VCT phase controller has means for calculating the actual VCT phase based on a crank angle signal and a cam angle signal, and
the control circuit configured to include the abnormality determining portion determines that there is an abnormality in the system of the VCT phase control when the calculating means is incapable to calculate the actual VCT phase due to an abnormality in the crank angle signal or the cam angle signal.

17. The variable valve timing control apparatus according to claim 10, wherein
the control circuit configured to include the VCT phase controller has means for learning a reference phase corresponding to a reference position of the VCT phase in a calculation of the actual VCT phase, and
the control circuit configured to include the abnormality determining portion determines that there is an abnormality in the system of the VCT phase control when the VCT phase control is unable to be started due to incompleteness in the learning of the reference phase.

18. The variable valve timing control apparatus according to claim 14, wherein
the control circuit configured to include the engine stall predicting portion predicts the generation of the engine stall when a lowering in a rotation speed of the engine relative to an idling-time rotation speed of the engine becomes equal to or larger than a predetermined value.

* * * * *